Patented May 30, 1933

1,911,560

UNITED STATES PATENT OFFICE

RUDOLF ETZKORN, OF OBERBRUCH, GERMANY, ASSIGNOR TO AMERICAN GLANZSTOFF CORPORATION, OF NEW YORK, N. Y., A CORPORATION OF DELAWARE

AGING OF ALKALI CELLULOSE

No Drawing. Application filed October 6, 1931, Serial No. 567,312, and in Germany February 20, 1931.

My present invention relates to a new process by which alkali cellulose may be aged.

One object of my invention is to provide a simple means for accelerating the aging of alkali cellulose.

Other objects will readily become apparent from a reading of the following specification.

In the manufacture of artificial filaments, films, etc., from viscose, the cellulose is usually obtained from cotton and wood, although other substances (flax, bagasse, etc.) have been subjected to experiments in this direction. This cellulose, usually in the form of sheets, is usually either immersed in or kneaded with a sodium hydroxide solution. The sheets, ordinarily, are cut to a convenient size, dried to a constant moisture-content, and stepped for from two to three hours. The soda is then drained and the soaked sheets pressed. This steeped pulp is then usually transferred to a disintegrating or kneading machine. The resulting crumbs of alkali cellulose are then aged or matured. My present invention has to do more specifically with this maturing or aging of the alkali cellulose.

One well-known method is to allow the freshly-prepared alkali cellulose to remain for a certain length of time, at atmospheric pressure, in more or less closed containers. The aging process has been found to progress more rapidly at slightly elevated temperatures. Usually the temperature has been maintained between 15° and 30° C. This aging ordinarily requires a number of hours, and may even take days. Attempts have been made to regulate the degree of aging by control of the time and temperature in order to obtain viscose solutions of a specified viscosity, suitable for the manufacture of artificial filaments, films, etc.

As the different types of pulpwood on the market possess varying characteristics, the aging conditions must be altered in order to obtain uniform viscosities.

Because of this variation, the average aging degree is very uncertain since it is usually dependent upon a prescribed time program. Further, the exact temperature to be maintained in the aging room is difficult to determine. This difficulty may be more readily seen when the considerations relative to one aging room, alone, are considered. If, because of a difference in the pulp qualities, it should become necessary to alter the temperature of this room, the alteration must proceed slowly. For example, it may not begin with the introduction of the new batch into the room because the alkali cellulose already present needs no temperature change. Even if the different batches might be advantageously separated, account must be taken of the poor conductivity of the crumbs of alkali cellulose.

My new process concerns more especially the control of the pressure in the aging containers. Through this pressure regulation I am able to obtain a control of the aging in a simple, sure, and inexpensive manner. According to tests which I have made the intensity of the aging process depends to a great extent upon the pressure employed. The following table shows some of the results which I have obtained.

| Excess pressure | Mixing viscosity/ball drop method |
|---|---|
| 55 | 2–3 |
| 20 | 3–4 |
| 5 | 12.5 |
| 2 | 17.5 |
| 1 | 23.5 |
| 0 (atmospheric pressure) | 40.0 |

This table, shows graphically, that an excess of pressure favorably affects the aging of the cellulose.

In carrying out the above indicated tests the alkali cellulose was kept at a temperature of 20° C. during its entire aging time (84 hours). The left-hand column in the above table indicates the excess pressures used during the different tests and the other column shows the differences produced in the aging process due to the pressure changes. After the alkali cellulose was aged, it was made into the xanthate in the usual manner and dissolved into a viscose solution of about 8% cellulose and 7% alkali.

After dissolving and freeing from air the differently pressure-treated solutions showed the viscosities (determined according to the ball-drop method) set forth in the second column above. These results conclusively show that a considerable reduction in the viscosity may be effected by means of relatively small excess pressures. The control of the pressure is relatively inexpensive and may be accomplished with lightly constructed apparatus and an air compressor.

I pointed out above, among the many objections to temperature control, the variations needed for different batches from pulps with varying characteristics. With my new method, of course, it would be necessary only to vary the pressure in the different containers. Any common independent regulating means could be used for this purpose.

For most practical purposes I have found that a good control of the viscosity may be obtained through the use of an aging temperature of 20° C. and an aging time of, for example, two days. The pressure used would vary between 1 and 2 atmospheres.

One form of apparatus by which my process might be accomplished would be: a series of airtight containers constructed to withstand excess pressures; and air tanks of a suitable size fed by compressors through pipe lines provided with closing and draining valves.

When a new pulp is used, for example one giving higher viscosities, it is necessary only to increase the pressure by a slight degree.

The aging conditions are therefore dependent upon the three factors: temperature, pressure, and time. According to the circumstances two or three of these may be controlled. As by controlling the pressure the effect of temperature may be compensated for, it is possible to maintain the temperature of the ripening room nearly equal with the temperature of the open air and vary the pressure. This results in a saving of heat.

Another advantage arising from my new invention lies in the fact that each individual container for the alkali cellulose may be separately controlled independent of whether or not the different batches are located all in one room, or occupy different locations.

Having now set forth my invention, what I desire to claim is:

1. A method for increasing the speed of aging of alkali cellulose which comprises increasing the pressure thereon.

2. A method for decreasing the aging speed of alkali cellulose which comprises decreasing the pressure thereon.

3. A method for increasing the speed of aging of alkali cellulose which comprises increasing the pressure thereon and temperature thereof.

4. In a process for aging alkali cellulose, the step of controlling the speed of aging through a control in the pressure exerted thereon and the temperature at which the cellulose is maintained, a decrease in the pressure and temperature resulting in a decrease in the speed of aging.

5. In a method for the production of ripened alkali cellulose, the steps of maintaining the temperature thereof between 15° and 30° C., and altering the pressure with respect to atmospheric pressure, an increase in pressure resulting in an increase in the ripening speed, and a decrease in pressure resulting in a decrease in the ripening speed.

6. In a method for equalizing the aging speed of alkali cellulose made up of different pulps, the step of individually regulating the pressure upon each pulp batch, an increase in the pressure on a single batch speeding the aging thereof, so that all the batches may be equally aged.

In testimony whereof I affix my signature.

RUDOLF ETZKORN.